Feb. 16, 1954  G. F. QUAYLE  2,669,314
WAREHOUSE TYPE TRACTOR WITH TRAILER COUPLING DEVICE
Filed Sept. 22, 1951  4 Sheets-Sheet 1
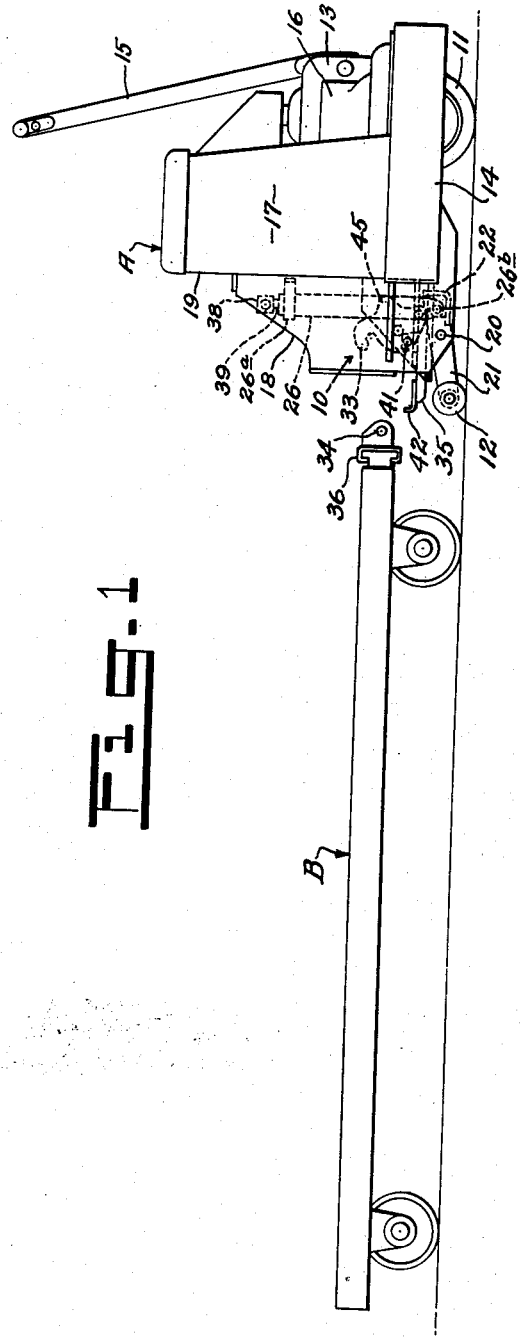
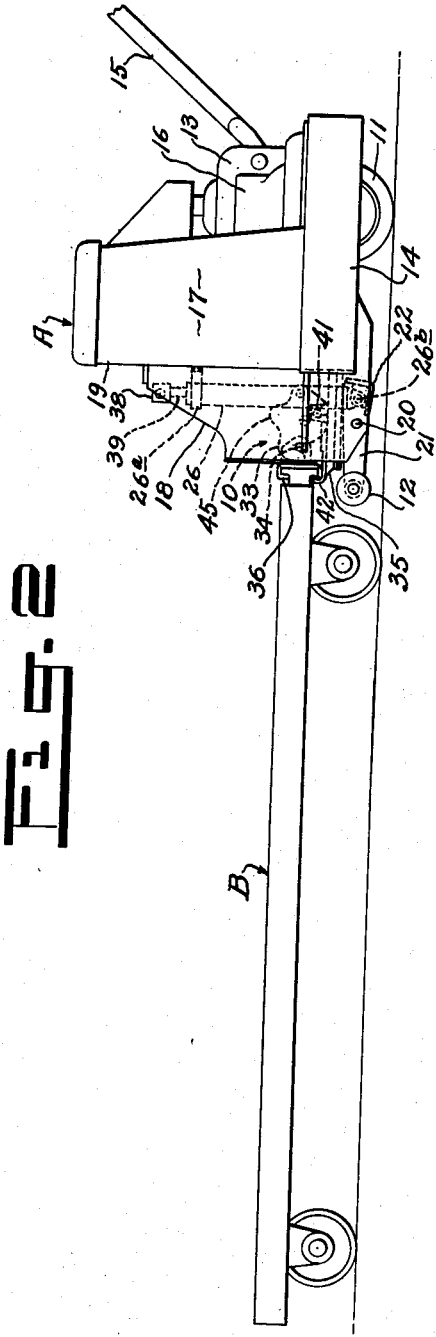
INVENTOR.
George F. Quayle.
BY
A. H. Golden
ATTORNEY

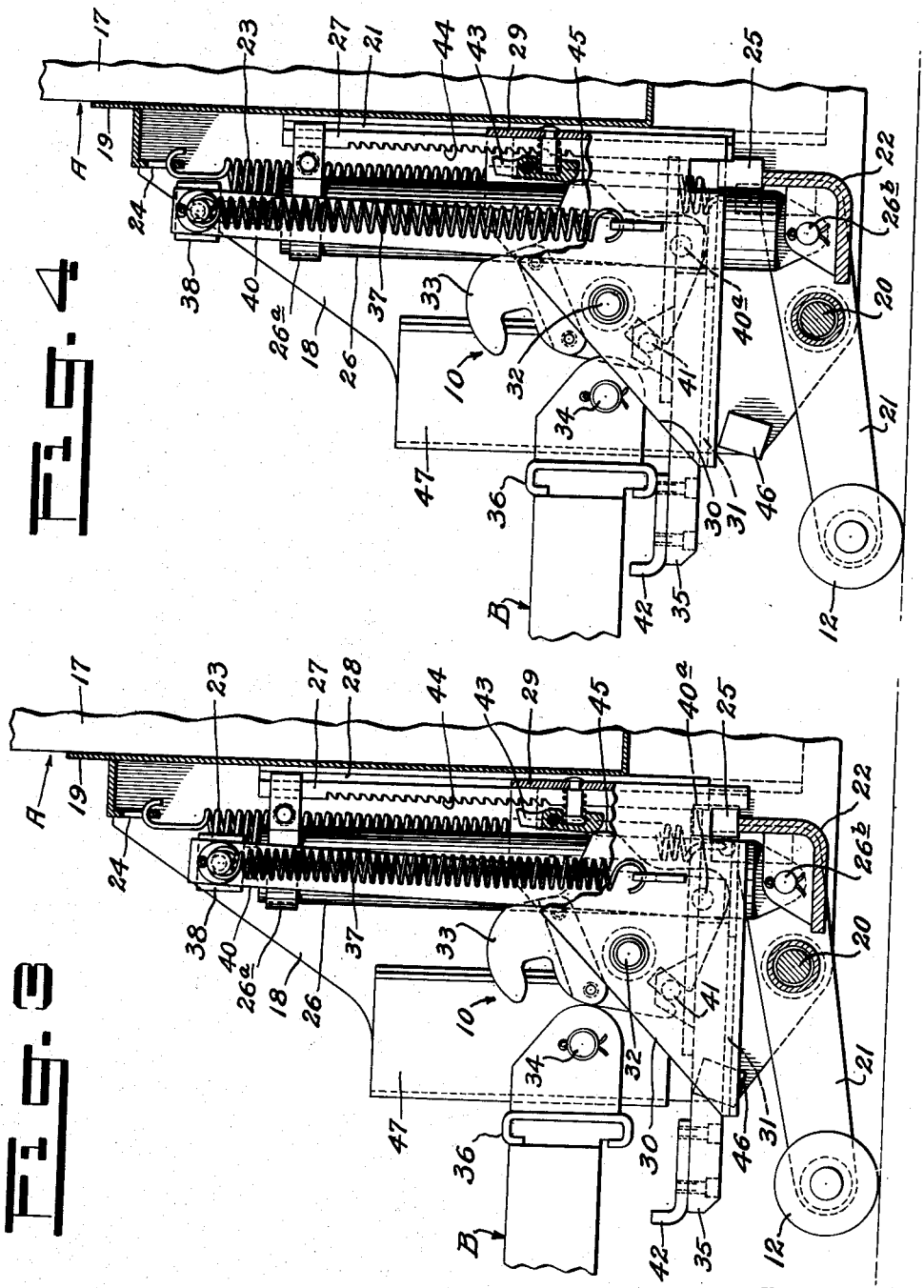

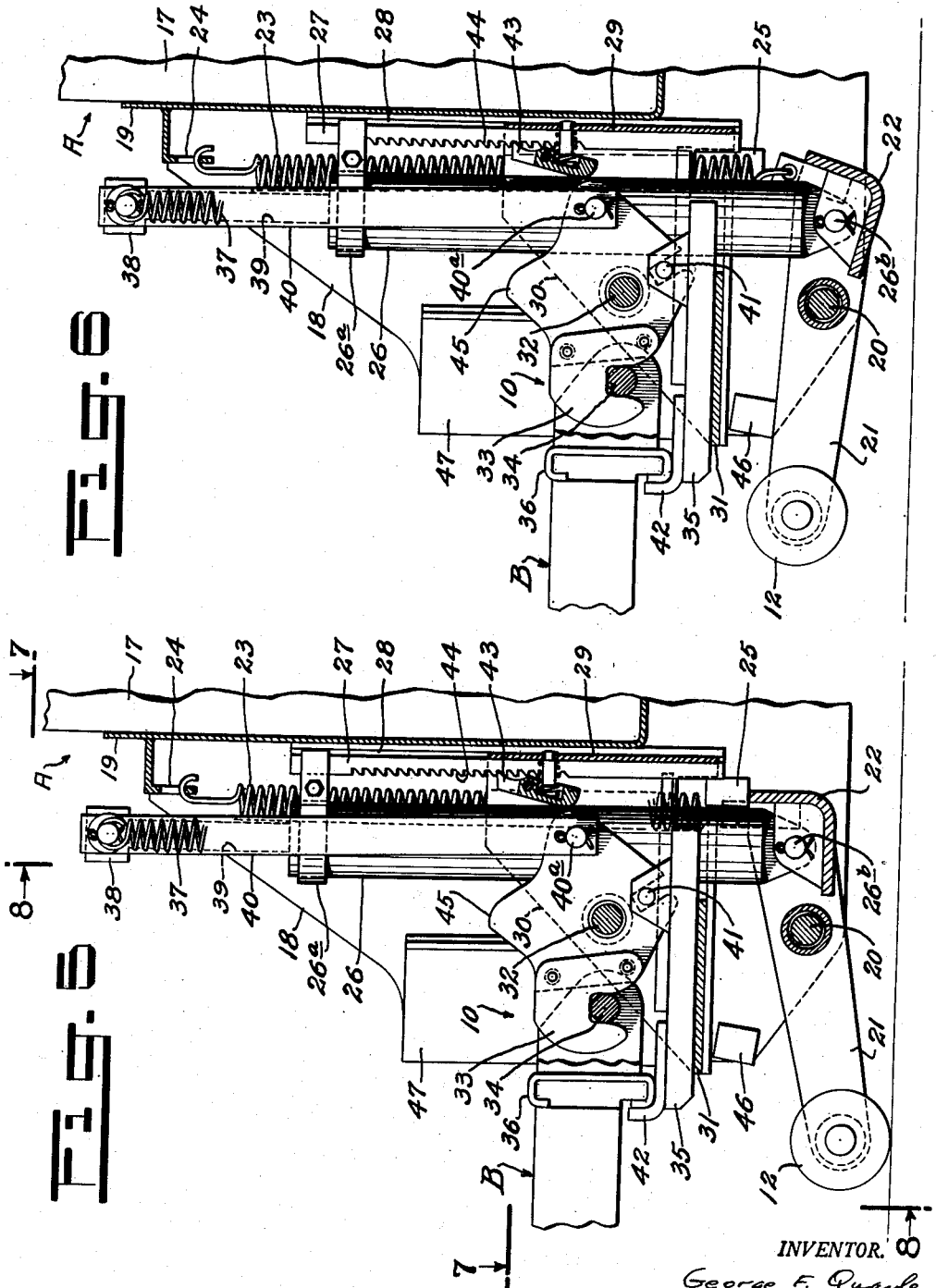

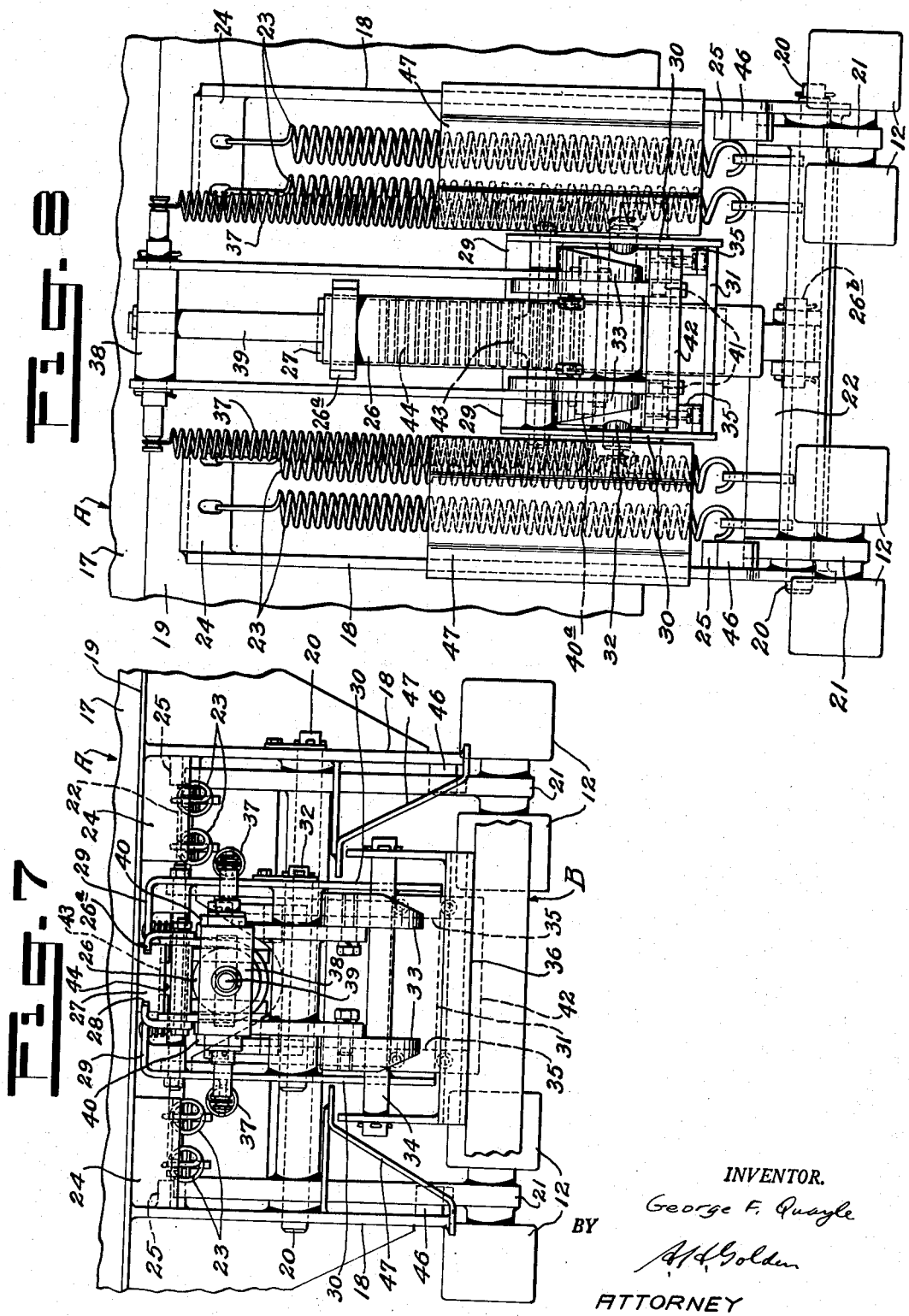

Patented Feb. 16, 1954

2,669,314

UNITED STATES PATENT OFFICE 2,669,314

WAREHOUSE TYPE TRACTOR WITH TRAILER COUPLING DEVICE

George F. Quayle, Philadelphia, Pa., assignor to The Yale & Towne Manufacturing Company, Stamford, Conn., a corporation of Connecticut Application September 22, 1951, Serial No. 247,800

19 Claims. (Cl. 180—12)

This invention relates to tractors of the class employed for towing trailers in warehouses and industrial plants and more particularly to an improved tractor that is constructed to operate as an integral unit with a trailer so as to obtain a high degree of maneuverability in the tractor and trailer combination.

As one feature of the invention, I provide means for coupling the tractor to a trailer with a moving part of the said coupling means functioning as a support for the tractor when not used as a coupler. As a further feature, the coupling means acts to support one end of the tractor when coupled to the trailer.

Another feature of my invention resides in the construction of the coupling means whereby it will grip forward trailer members that may have various shapes and that may be disposed at various levels. Strict conformance of the trailer to a particular standard of construction is therefore unnecessary in order to obtain satisfactory operation.

As a more detailed feature of my invention, the tractor supporting part moving with the coupling means is preferably in the form of one or more wheels that are in engagement with the ground when the coupling means is in uncoupled position, and that are moved away from the ground when the coupling means is in coupled position.

I have thus outlined rather broadly the more important features of my invention in order that the detailed description thereof that follows may be better understood, and in order that my contribution to the art may be better appreciated. There are, of course, additional features of my invention that will be described hereinafter and which will form the subject of the claims appended hereto. Those skilled in the art will appreciate that the conception on which my disclosure is based may readily be utilized as a basis for the designing of other structures for carrying out the several purposes of my invention. It is important, therefore, that the claims be regarded as including such equivalent constructions as do not depart from the spirit and scope of my invention, in order to prevent the appropriation of my invention by those skilled in the art.

Referring now to the drawings:

Fig. 1 is a side view showing my novel tractor as it would appear when approaching coupling position relatively to a trailer.

Fig. 2 is a view similar to Fig. 1, but showing the tractor fully coupled to the trailer.

Fig. 3 is a partial view in longitudinal section showing the tractor in position to be coupled with the trailer, but prior to actuation of the coupling mechanism.

Fig. 4 is a view similar to Fig. 3, but showing a part of the coupling mechanism moved toward coupling position.

Fig 5 is a similar view showing the parts in a further coupled relation.

Fig. 6 is a view showing the wheels lifted in the final step of the coupling operation.

Fig. 7 is a plan view taken on the line 7—7 of Fig. 5.

Fig. 8 is a rear view of a portion of the tractor taken on the line 8—8 of Fig. 5.

In the drawings, I have indicated my novel tractor by the letter A, and a trailer with which it is adapted to operate by the letter B. In order to understand the invention it will be well to know that, when coupled for operation, the tractor A is supported at one end upon the trailer B by a coupling means indicated generally as 10 and at the other end by a ground engaging wheel or wheels 11. When the tractor A is not coupled to the trailer B, it is stabilized through additional or auxiliary supporting wheels 12 that are themselves novel in the combination, but that are held out of operating position when the tractor is coupled to the trailer. The coupling means 10 is arranged to lock the tractor A against movement relatively to the trailer B, as will be described in detail, and thereby permits the tractor and the trailer to be maneuvered in a precise manner as a unit through the action of the wheel 11 that, in a preferred form of my invention, serves as a driving and steering wheel. Preferably, the trailer B is of the type having casters at one end in order to facilitate the steering operation.

As the driving and steering means including the wheel 11, I have chosen to illustrate a construction that is known in the field of industrial trucks and that comprises a steering head 13 pivotally mounted in the frame 14 of the tractor A and furnished with a steering handle 15. A drive means 16 for the wheel 11 is incorporated in the steering head 13, and receives its power under the control of the operator from a battery or other power source located in a battery compartment 17 that is mounted upon the frame 14 immediately behind the steering head 13. The specific construction of the driving and steering means is not important to my invention, however, and I may utilize in the tractor any suitable means that can be compactly arranged and that will perform the driving and steering functions through one or more ground engaging wheels adjacent to one end of the tractor.

Proceeding now to a more detailed description of my invention, the tractor frame 14 has as an integral part thereof a pair of rearwardly extending spaced plate members 18. These members extend vertically upwardly from the lower portion of the frame 14 and are welded to the back wall 19 of the battery compartment 17. Between lower portions of the plate members 18 is mounted a transverse shaft 20 that carries the auxiliary wheels 12 by means of a wheel bracket comprising a pair of wheel supporting levers 21. The levers 21 are integrally connected forwardly of the shaft 20 by a cross member 22 and are so arranged that the auxiliary wheels 12 may move upwardly and downwardly in relation to the tractor frame 14. The wheels 12 are urged into a downward position, however, through the action of a suitable yielding means such as the wheel depressing springs 23 that are connected between the cross member 22 and a pair of anchor lugs 24 on an upper portion of the back wall 19. The stiffness of the springs 23 is such that they can hold the wheels 12 depressed against the ground for supporting the tractor A, stop blocks 25 on the plate members 18 acting as limits for the wheel bracket in this position. Upward movement of the wheels 12 will be brought about under particular circumstances through the action of a hydraulic ram 26 that is pivoted at 26b to the transverse member 22, and that has an upper cylinder clamp 26a guiding it for vertical movement. However, in order to provide an understanding of this action of the ram 26, the coupling means 10 must first be described in greater detail.

A vertical guide 27 is fixed in a central position upon the back wall 19 of the battery compartment 17 (Figs. 3 to 7). In the opposite sides of the vertical guide 27 are a pair of grooves or ways 28 which receive the inturned flanges 29 of an outwardly extending coupler bracket 30 so as to mount this bracket for vertical sliding movement in the ways. The ways 28 also guide the cylinder clamp 26a. Actually, the coupler bracket 30, best seen in Figs. 3, 7 and 8, is a pair of spaced vertical side plates connected by a horizontal bottom plate 31, and these plates carry a transverse shaft 32 upon which a pair of hooked coupler members 33 are mounted for vertical swinging movement. The hooked coupler members 33 are so shaped that when they are swung in a downward direction in Figs. 3 and 4, they may engage over any suitable member upon the forward part of the trailer B, such as the lateral shaft 34.

The hooked coupler members 33 do not operate alone, but are arranged to operate in conjunction with a lower coupler member 35 that slides in a direction longitudinally of the tractor A upon the bottom plate 31 of the coupler bracket 30, as best seen in Figs. 3 and 5. The lower coupler member 35 performs several important functions, and in describing this member it will be observed first of all that it moves vertically with the bracket 30 as the latter slides in the guide ways 28. In its initial position, prior to the coupling operation, the coupler bracket 30 is at its lowest point as shown in Fig. 3, thus permitting the lower coupler member 35 to be inserted below the forward transverse member 36 of the trailer B through maneuvering of the tractor A. The coupler bracket 30 will then be lifted by the ram 26 so as to bring the coupler member 35 against the underside of the forward trailer member 36 (Fig. 4). The ram 26 performs this action through the intermediary of a pair of coil springs 37 that are attached at their lower ends to the coupler bracket 30 and at their upper ends to a crosshead 38 mounted on the plunger 39 of the ram 26. During this phase of the operation, the springs 37 serve merely as links and undergo no extension.

Having engaged the underside of the trailer member 36, the lower coupler member 35 will stop further upward movement of the bracket 30, and the springs 37 will now yield during continued movement of the ram 26 so that the hooked coupler members 33 will remain at the proper level to engage the trailer B. When the springs 37 yield, the ram plunger 39 will, of course, be moving relatively to the bracket 30, and this movement will operate through a pair of connecting bars 40 (Figs. 5, 6 and 8) that are attached at 40a to the coupler members 33 and at their upper ends to the cross head 38, to swing the hooked coupler members 33 into engagement with the shaft 34 on the trailer B.

Since ram 26 is pivoted at 26a to wheel bracket cross member 22, it will be observed at this point that the reaction of the ram 26 in raising bracket 30 and in operating the coupling members will be taken by the wheel depressing springs 23 through the said wheel bracket cross member 22. Because springs 23 are relatively stiff, the ram 26 will not as yet produce any lifting movement of the auxiliary wheels 12.

As the hooked coupler members 33 start to move downwardly, the lower coupler member 35 will be drawn inwardly upon the bottom bracket plate 31 by virtue of a pin-and-slot connection 41 between the lower portions of the hooked coupler members 33 and the lower coupler member 35. The outer end of the lower coupler member 35 is provided with an upstanding lip 42 that now engages behind the transverse member 36 of the trailer, so that the inward sliding movement of the coupler member 35 will draw the trailer into proper coupling relationship to the tractor if the trailer is not already in this position. The forward part of the trailer, including the member 36 and the shaft 34, will then be effectively confined between the hooked coupler members 33 and the lower coupler member 35, as shown in Fig. 5.

At this stage in the operation, the entire coupling means 10 has been located at the proper level by contact of the lower coupler member 35 with the underside of the trailer B, and the coupler members 33 and 35 are held in gripping relationship to the trailer through the force of the ram and can close no further. The thrust of ram 26 during the actuation of couplers 33 and 35 has been accepted by springs 23 that have thus far maintained wheels 12 against the ground. It is desirable that the coupling means 10, having reached its proper coupling level, be locked positively against further upward movement. Otherwise, if the trailer B should happen to be light in weight, it would be lifted from the ground by the action of the ram 26, and the ram would be incapable of lifting wheels 12 as hereinafter set forth. In order to perform this locking action, I mount upon the coupler bracket 30 a spring-pressed pawl 43 that is adapted to engage a rack 44 formed on the vertical guide 27. During the time that the coupler bracket 30 is being adjusted vertically to the level of the trailer B (Figs. 3 and 4), the pawl 43 is held out of engagement with the rack 44 by a cam nose or noses 45 formed on one or both of the hooked coupler members 33. When the bracket 30 has reached its proper level, however, and the hooked coupler members 33 swing into coupled position, the cam nose 45 moves away from the pawl 43 which then prevents further upward movement of the bracket 30 by the continued extension of ram 26.

The downward reaction incidental to the continued extension of the ram 26 will thereafter overcome the relatively strong wheel depressing springs 23, with the result that the auxiliary wheels 12 will be lifted from the ground (Fig. 6), and the complete coupling operation will terminate with engagement of the wheel supporting levers 21 with stop blocks 46 on the frame plate members 18. Because the coupler bracket 30 has already been locked by the pawl 43 against upward movement relatively to the tractor A, the coupler bracket will accept the weight of the rear end of the tractor for supporting it upon the trailer B.

While I have shown my novel coupling means 10 as operating in conjunction with a trailer B having a particular construction at its forward end, including the transverse member 36 and the shaft 34, it will be observed that this coupling means is capable of operation with substantially any trailer having a member upon which the hooked coupler members 33 and the lower coupler member 35 can be locked, provided such trailer member is disposed at a level that is within the range of vertical movement of the coupling means. When used with the trailer structure shown, I prefer to mount upon the rear portions of the plate member 18 a pair of converging guide members 47, best seen in Fig. 7, that will direct the trailer shaft 34 into proper lateral relationship to the coupling means 10 when the tractor A is being maneuvered into coupling position relatively to the trailer B.

It is believed that the operation of my novel tractor will be apparent from the foregoing description. However, to summarize the operation briefly, the tractor A will, as a preliminary step, be maneuvered into a coupling position in which the lower coupler member 35 is disposed beneath the forward member 36 of the trailer B, as shown in Fig. 3. The operator will then merely actuate the hydraulic ram 26 through the suitable hydraulic means provided. The thrusting action of the ram 26 will first raise the coupler bracket 30 until the lower coupler member 35 is against and is stopped by the trailer member 36. The springs 37 will then extend and the ram 26 will thereby operate through the connecting bars 40 to swing the hooked coupler members 33 downwardly. Simultaneously, the lower coupler member 35 will move inwardly so as to draw the trailer B toward the tractor A, if necessary, and to confine the end structure of the trailer between the coupler members 33 and 35. At the same time, the downward movement of the coupler member 33 will cause the coupling means 10 to be locked against further upward movement through engagement of the pawl 43 with the rack 44. Still further thrusting action of the ram 26 will swing the auxiliary wheels 12 upwardly until the wheel supporting levers 21 engage the stop blocks 46, whereupon the tractor A will be supported entirely by the coupling means 10 and the driving and steering wheel 11. Since the coupling means is locked to the trailer at laterally spaced points and holds the tractor A securely against turning relatively to the trailer B, the tractor and the trailer will now form an integral unit that is closely coupled and that will be maneuvered through the driving and steering action of the wheel 11.

Uncoupling will be merely a reversal of the coupling operation, with the parts moving in reverse order upon release of the fluid pressure in the ram 26. The actuating forces will then be provided by the springs 23 to depress the auxiliary wheels 12, and by the springs 37 to release the coupling members 33 and 35, after which the coupling means 10 will sink to its initial lower position as shown in Fig. 3.

I now claim:

1. In a tractor of the class described, a steering head, a drive wheel in said steering head supporting one end of said tractor, additional wheels for said tractor, means mounting said additional wheels for upward and downward movement relatively to said tractor, means holding said additional wheels downwardly relatively to said tractor on said mounting means whereby to support the other end of said tractor, coupling means, means mounting said coupling means for coupling movement, power means for moving said coupling means on their mounting means for coupling with a part of a trailer, and means whereby said power means moves said additional wheels upwardly on their mounting means after first moving said coupling means to effect support of said other end of said tractor on the trailer through said coupling means.

2. In a tractor of the class described, a steering head, a drive wheel in said steering head supporting one end of said tractor, additional wheels for said tractor, means mounting said additional wheels for movement upwardly and downwardly relatively to said tractor power means for moving said additional wheels upwardly on their mounting means, a coupler, means mounting said coupler for coupling movement, means through which said power means moves said coupler into coupling relation to a trailer when said additional wheels are retracted upwardly whereby to effect support of said other end of said tractor on the trailer through said coupler, means for moving said additional wheels downwardly to support said other end of said tractor, and means then moving said coupler out of coupling relation to the trailer.

3. In a tractor of the class described, a steering head, a drive wheel in said steering head supporting one end of said tractor, additional wheels for said tractor, means for moving said additional wheels upwardly relatively to said tractor, yielding means holding said additional wheels downwardly relatively to said tractor to support the other end of said tractor, a coupler, means mounting said coupler for coupling movement at said other end of said tractor, means moving said coupler into coupling relation to a trailer, and means overcoming the force of said yielding means to lift said additional wheels when said coupler is moved into coupling relation to the trailer whereby to effect support of said other end of said tractor upon said coupler, said yielding means moving said additional wheels downwardly to support said other end of said tractor when said coupler is moved out of coupling relation to the trailer.

4. In a tractor of the class described, a steering head, a drive wheel in said steering head supporting one end of said tractor, a coupler, means mounting said coupler for coupling movement at the other end of said tractor, additional wheels for said tractor, means mounting said additional wheels for movement upwardly and downwardly on said tractor, means pressing said additional wheels on their mounting means to a position below said tractor whereby to support said other end of said tractor, power means moving said coupler into coupling relation to a trailer, and parts through which said power means acts on said wheel mounting means after moving said coupler out of coupling relation to the trailer to raise said additional wheels against the pressure of said pressing means whereby to effect support of said other end of said tractor on the trailer through said coupling means.

5. In a tractor of the class described, a steering head, a drive wheel in said steering head supporting one end of said tractor, additional wheels for said tractor, means mounting said additional wheels for upward and downward movement relatively to said tractor, means holding said additional wheels downwardly relatively to said tractor on said mounting means whereby to support the other end of said tractor, a ram, coupling means, means mounting said coupling means for coupling movement, means through which said ram actuates said coupling means on its mounting means for coupling with a trailer, means whereby said ram after actuating said coupling means retracts said additional wheels upwardly, and a portion on said coupling means for supporting said other end of said tractor on the trailer when said additional wheels are in retracted position.

6. In a tractor of the class described, a steering head, a drive wheel in said steering head supporting one end of said tractor, additional wheels for said tractor, means mounting said additional wheels for upward and downward movement relatively to said tractor, spring means holding said additional wheels downwardly relatively to said tractor on said mounting means whereby to support the other end of said tractor, a ram, coupling means, means through which said ram actuates said coupling means for engaging a trailer whereby to support said other end of said tractor, and means whereby said ram overcomes said spring means to retract said additional wheels upwardly to effect support of said other end of said tractor on the trailer through said coupling means.

7. In a tractor of the class described, a forward wheel supporting one end of said tractor, rear wheels for said tractor, means mounting said rear wheels for upward and downward movement relatively to said tractor, means holding said rear wheels downwardly relatively to said tractor on said mounting means whereby to support the rear end of said tractor, coupling means, a ram, means whereby said ram actuates said coupling means for coupling with a trailer, means through which said wheel mounting means accepts the thrust of said ram for retracting said additional wheels upwardly after said ram first actuates said coupling means, and a portion on said coupling means for supporting said rear end of said tractor on the trailer when said additional wheels are in retracted position.

8. In a tractor of the class described, a steering head, a drive wheel in said steering head supporting one end of said tractor, additional wheels for said tractor, means for holding said additional wheels downwardly relatively to said tractor whereby to support the other end of said tractor, coupling means for coupling said tractor to a trailer, means mounting said coupling means for vertical movement relatively to said tractor, power means, means through which said power means moves said coupling means vertically on its mounting means whereby to adjust said coupling means to the level of the trailer, means through which said power means actuates said coupling means when adjusted to the level of the trailer to couple with the trailer, parts through which said power means acts upon said wheel holding means when said coupling means is coupled with the trailer to retract said additional wheels upwardly, and a portion on said coupling means for supporting said other end of said tractor on the trailer when said additional wheels are in retracted position.

9. In a tractor of the class described, a steering head, a drive wheel in said steering head supporting one end of said tractor, additional wheels for said tractor, means holding said additional wheels downwardly relatively to said tractor whereby to support the other end of said tractor, coupling means for coupling said tractor to a trailer, means mounting said coupling means for vertical movement on said tractor, power means, means through which said power means sequentially moves said coupling means vertically on its mounting means whereby to adjust said coupling means to the level of the trailer and then into coupling relation to the trailer, means whereby said power means acts upon said wheel holding means to retract said additional wheels upwardly after first moving said coupling means to coupling position, and a portion on said coupling means for supporting said other end of the tractor on the trailer when said additional wheels are in retracted position.

10. In a tractor of the class described, a steering head, a drive wheel in said steering head supporting one end of said tractor, additional wheels for said tractor, means for holding said additional wheels downwardly relatively to said tractor whereby to support the other end of said tractor, coupling means for coupling said tractor to a trailer, means mounting said coupling means for vertical movement relatively to said tractor, power means, means through which said power means moves said coupling means vertically on its mounting means whereby to adjust said coupling means to the level of the trailer, means through which said power means moves said coupling means to couple with the trailer, means actuated through coupling movement of said coupling means to hold said coupling means against upward movement on said tractor, parts through which said power means acts upon said wheel holding means when said coupling means is coupled with the trailer to retract said additional wheels upwardly, and a portion on said coupling means for supporting said other end of said tractor on the trailer through said coupling means when said additional wheels are in retracted position.

11. In a tractor of the class described, a wheel supporting one end of said tractor, additional wheels for said tractor, wheel depressing springs holding said additional wheels in position to support the other end of said tractor, coupling means for coupling said tractor to a trailer, a ram effecting coupling movement of said coupling means whereby to afford support of said other end of said tractor on the trailer, and means whereby the reaction of said ram is accepted by said wheel depressing springs for retracting said additional wheels upwardly after coupling movement of said coupling means.

12. In a tractor of the class described, a wheel supporting one end of said tractor, additional wheels for said tractor, wheel depressing springs holding said additional wheels in position to support the other end of said tractor, coupling means for coupling said tractor to a trailer, means mounting said coupling means for vertical movement relatively to said tractor, a ram, coupler lifting springs through which said ram lifts said coupling means on its mounting means into engagement with a trailer, means whereby said ram effects coupling movement of said coupling means upon yielding of said coupler lifting springs after engagement of said coupling means with the trailer to afford support of said other end of said tractor on the trailer, and means whereby the reaction of said ram is accepted by said wheel depressing springs for retracting said additional wheels upwardly upon completion of the coupling operation.

13. In a tractor of the class described, a coupler having upper and lower parts, means mounting said coupler for vertical movement on said tractor, a hydraulic ram, means whereby said hydraulic ram raises said coupler to bring said lower coupler part against a portion of a trailer to be coupled to said tractor, means whereby said ram thereafter moves said upper part to couple said tractor to the trailer, means for locking said coupler against vertical movement relatively to said tractor when said upper coupler part moves to coupling position, a support wheel for said tractor, and means whereby the extension of said ram once said coupler is in coupled position reacts to move said support wheel upwardly relatively to said tractor.

14. In a tractor of the class described, a support wheel for said tractor, coupling means on said tractor, power means, means through which said power means moves said coupling means for coupling said tractor to a trailer, means through which said power means lifts said support wheel relatively to said coupling means after first moving said coupling means to coupling position whereby to permit support of said tractor on the trailer through said coupling means, means for moving said support wheel downwardly relatively to said coupling means, and means for uncoupling said coupling means after said support wheel is moved downwardly whereby to effect support of said tractor through said support wheel.

15. In a tractor of the class described, a support wheel for said tractor, coupling means on said tractor, power means, means through which said power means moves said coupling means upwardly relatively to said tractor whereby to adjust said coupling means to coupling level relatively to a trailer, means through which said power means actuates said coupling means for coupling said tractor to the trailer, means through which said power means lifts said support wheel relatively to said tractor whereby to permit support of said tractor on the trailer through said coupling means, means for moving said support wheel downwardly relatively to said tractor, means for uncoupling said coupling means whereby to effect support of said tractor on said support wheel in its downward position, and means then moving said coupling means to its original downward position relatively to the tractor.

16. In a tractor of the class described, a support wheel for said tractor, coupling means on said tractor, a ram actuating said coupling means for coupling said tractor to a trailer, means whereby said ram lifts said support wheel relatively to said tractor whereby to permit support of said tractor on the trailer through said coupling means, spring means for moving said support wheel downwardly relatively to said tractor, and spring means for uncoupling said coupling means whereby to effect support of said tractor on said support wheel in its downward position.

17. In a tractor of the class described, a steering head, a drive wheel in said steering head supporting one end of said tractor, additional wheels for said tractor, means mounting said additional wheels for upward and downward movement relatively to said tractor, means for pressing said additional wheels downwardly relatively to said tractor on said mounting means whereby to support the other end of said tractor, an upper coupling member, a lower coupling member, means mounting said upper and lower coupling members for coupling movement, power means, means through which said power means moves said lower coupling member upwardly on its mounting means against the under side of a part of a trailer, means through which said power means then moves said upper coupling member downwardly on its mounting means toward said lower coupling member whereby to confine said trailer part between said coupling members, and parts through which said power means after moving said coupling members retracts said additional wheels upwardly against the pressure of said pressing means to effect support of said other end of said tractor on the trailer through said coupling members.

18. In a tractor of the class described, a forward wheel for supporting one end of said tractor, rear wheels for supporting the rear of said tractor, means mounting said rear wheels for movement upwardly and downwardly relatively to the rear end of said tractor, a coupler, means mounting said coupler for coupling movement at the rear end of said tractor, a ram, and means whereby the continuous extension of said ram first moves said coupler into coupling relation to a trailer and then moves said rear wheels upwardly relatively to said tractor, said wheels moving downwardly first and then said coupling means releasing the trailer upon the reverse operation of said ram.

19. In a tractor of the class described, a forward wheel for supporting the forward end of said tractor, rear wheels for supporting the rear end of said tractor, means mounting said rear wheels for movement upwardly and downwardly relatively to said tractor, a coupler, means mounting said coupler for coupling movement at said rear end of said tractor, power means, and means whereby the continued movement of said power means in one direction first moves said coupler into coupling relation to a trailer and thereafter moves said additional wheels upwardly relatively to said tractor.

GEORGE F. QUAYLE.

References Cited in the file of this patent

UNITED STATES PATENTS

| Number | Name | Date |
|---|---|---|
| 1,608,793 | Jackson et al. | Nov. 30, 1926 |
| 2,403,973 | George | July 16, 1946 |
| 2,421,867 | Bizjak | June 10, 1947 |
| 2,431,245 | Haig | Nov. 18, 1947 |
| 2,559,962 | Hudson | July 10, 1951 |